United States Patent [19]

Kleinstück et al.

[11] Patent Number: 4,623,672

[45] Date of Patent: Nov. 18, 1986

[54] ISOCYANATE ADDITION PRODUCTS AND A PROCESS FOR THEIR PRODUCTION

[75] Inventors: Roland Kleinstück, Bergisch-Gladbach; Rolf Wiedermann, Odenthal, both of Fed. Rep. of Germany

[73] Assignee: Bayer Aktiengesellschaft, Leverkusen, Fed. Rep. of Germany

[21] Appl. No.: 762,166

[22] Filed: Aug. 5, 1985

[30] Foreign Application Priority Data

Aug. 17, 1984 [DE] Fed. Rep. of Germany ....... 3430285

[51] Int. Cl.$^4$ ..................... C08G 18/38; C08G 18/14
[52] U.S. Cl. .................................. 521/108; 521/168; 521/906; 528/51
[58] Field of Search ...................... 521/108, 906, 168; 528/51

[56] References Cited

U.S. PATENT DOCUMENTS

| | | | |
|---|---|---|---|
| 2,612,513 | 9/1952 | Gluesenkamp et al. | 260/461 |
| 2,724,718 | 11/1955 | Stiles et al. | 260/461 |
| 2,957,931 | 10/1960 | Hamilton et al. | 260/403 |
| 3,664,975 | 5/1972 | Kerst | 521/108 |
| 4,525,489 | 6/1985 | Narayan | 521/108 |

*Primary Examiner*—Herbert S. Cockeram
*Attorney, Agent, or Firm*—Gene Harsh; Joseph C. Gil; Lyndanne M. Whalen

[57] ABSTRACT

Flame retardant isocyanate addition products are made by reacting an isocyanate with a compound selected from the group consisting of 1-phosphonoethane-2-carboxylic acid-tri-$C_1$-$C_4$-alkyl esters, 1-phosphonopropane-2-carboxylic acid-tri-$C_1$-$C_4$-alkyl esters and mixtures thereof. Known isocyanate-reactive compounds, blowing agents, catalysts, additives and auxiliary agents may optionally be included in the reaction mixture. These flame retardant products are useful in construction applications such as insulation panels for roof insulation.

19 Claims, No Drawings

ISOCYANATE ADDITION PRODUCTS AND A PROCESS FOR THEIR PRODUCTION

BACKGROUND OF THE INVENTION

The present invention relates to isocyanate addition products and to a process for their production.

Phosphorus-containing flame retardants have been used for some time in the production of plastic materials based on isocyanates such as polyurethane and polyisocyanurate plastic materials, including foams. Trichloroethyl phosphate and dimethylmethane phosphonate (DMMP) are common flame retardants.

The trichloroethyl phosphate flame retardants frequently cause a blowing agent (for example, trichlorofluoro-methane) to be sparingly soluble in the polyol mixture. The DMMP flame retardant leads to good solubility for the blowing agent, but can be used only in low concentrations because it makes the finished foams very flexible and also gives off strong odors during processing.

SUMMARY OF THE INVENTION

It is an object of the present invention to provide a flame retarding agent for isocyanate addition products.

It is also an object of the present invention to provide a flame retarding agent for isocyanate addition products which does not significantly diminish blowing agent solubility and does not render the isocyanate addition product too flexible.

It is also an object of the present invention to provide flame retardant isocyanate addition products.

It is a further object of the present invention to provide flame retardant polyurethane and polyisocyanurate materials, particularly foams.

These and other objects which will be apparent to those skilled in the art are accomplished by reacting (a) an isocyanate with (b) a compound selected from the group consisting of 1-phosphonoethane-2carboxylic acid-tri-$C_1$-$C_4$-alkyl esters, 1-phosphonopropane-2-carboxylic acid-tri-$C_1$-$C_4$-alkyl esters and mixtures thereof and optionally, with (c) a compound containing at least two hydrogen atoms which are reactive with isocyanate groups and have a molecular weight of from 400 to 10,000, optionally in the presence of a blowing agent and/or other auxiliary agents and additives.

DETAILED DESCRIPTION OF THE INVENTION

It has surprisingly been found that 1-phosphonoethane- and/or -propane-2-carboxylic acid-tri-$C_1$-$C_4$-alkyl esters produce excellent solubility for organic blowing agents. Additionally, these materials do not make or barely make the plastic materials based on isocyanates flexible nor do they present the odor problems encountered with known flame retardants.

The present invention relates to the use of 1-phosphonoethane- and/or -propane-2-carboxylic acid-tri-$C_1$-$C_4$-alkyl esters in the production of plastic materials based on isocyanates. It is preferable to use the 1-phosphonoethane- and/or -propane-2-carboxylic acid-tri-$C_1$-$C_4$-alkyl esters in a quantity of from 1 to 20 wt. %, more preferably in a quantity of from 2 to 10 wt. %, based on the isocyanate addition product. It is also preferred to use 1-phosphonoethane- and/or -propane-2-carboxylic acid-trimethyl esters. These esters are known and may be produced by methods known to those in the art (compare U.S. Pat. Nos. 29 57 931, 26 12 513, 27 24 718; further A. N. Pudovik and B. A. Arbusov, Doklady Akad. SSSR, 73, 327 (1950); Chem. Abstr. 45, 2853 (1951)).

The production of plastic materials based on isocyanates is known and is described, for example, in German Offenlegungsschriften 1,694,142, 1,694,215 and 1,720,768 and in Kunststoff-Handbuch Vol. III, Polyurethane, edited by Vieweg and Hochtlen, Carl Hanser Verlag, Munich 1966 and in the new edition of this book, edited by G. Oertel, Carl Hanser Verlag, Munich, Wien 1983.

These isocyanate addition products are predominantly urethane and/or isocyanurate and/or allophanate and/or uretdione and/or urea and/or carbodiimide group-containing materials. Use of the flame retardants of the present invention in the production of polyurethane and polyisocyanurate plastic materials, in particular foams is preferred.

Isocyanates useful in the production of the isocyanate addition products of the present invention include aliphatic, cycloaliphatic, araliphatic, aromatic and heterocyclic polyisocyanates of the type described, for example, by W. Siefken in Justus Liebigs Annalen der Chemie, 562, pages 75 to 136, for example those corresponding to the formula $$Q(NCO)_n$$

in which n=2–4, preferably 2, and

Q represents an aliphatic hydrocarbon radical containing from 2 to 18 (preferably from 6 to 10) carbon atoms, a cycloaliphatic hydrocarbon radical containing from 4 to 15 (preferably from 5 to 10) carbon atoms, an aromatic hydrocarbon radical containing from 6 to 15 (preferably from 6 to 13) carbon atoms, or an araliphatic hydrocarbon radical containing from 8 to 15 (preferably from 8 to 13) carbon atoms.

Specific examples of such isocyanates are ethylenediisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate and any mixtures of these isomers, 1-isocyanato-3,3,5-trimethyl-5-isocyanatomethyl-cyclohexane (German Auslegeschrift No. 1,202,785, U.S. Pat. No. 3,401,190), 2,4- and 2,6-hexahydrotoluylene diisocyanate and any mixtures of these isomers, hexahydro-1,3- and/or -1,4-phenylene diisocyanate, perhydro-2,4'- and/or -4,4'-diphenylmethane-diisocyanate, 1,3- and 1,4-phenylene diisocyanate, 2,4- and 2,6-toluylene diisocyanate and any mixtures of these isomers, diphenylmethane-2,4'- and/or -4,4'-diisocyanate, naphthylene-1,5-diisocyanate.

Other suitable isocyanates include: triphenylmethane-4,4',4''-triisocyanate: polyphenyl-polymethylene-polyisocyanates of the type obtained by aniline formaldehyde condensation and subsequent phosgenation (described for example, in British Pat. No. 874,430 and 848,671); m- and p-isocyanato phenylsulfonyl isocyanates (U.S. Pat. No. 3,454,606); perchlorinated aryl polyisocyanates of the type described, for example, in German Auslegeschrift No. 1,157,601 (U.S. Pat. No. 3,277,138): carbodiimide group-containing polyisocyanates of the type described in German Offenlegungsschriften (U.S. Pat. No. 3,152,162) and in German Pat. No. 1,092,007 Offenlegungsschriften Nos. 2,504,400, 2,537,685 and 2,552,350: norbornane diisocyanates (U.S.

Pat. No. 3,492,330); allophanate-containing polyisocyanates of the type described, for example, in British Pat. No. 994,890, Belgian Pat. No. 761,626 and Netherlands Patent Application No. 7,102,524; isocyanurate group-containing polyisocyanates of the type described, for example, in U.S. Pat. No. 3,001,973, in German Pat. Nos. 1,022,789, 1,222,067 and 1,027,394 and in German Offenlegungschriften No. 1,929,034 and 2,004,048; urethane group-containing polyisocyanates of the type described for example, in Belgian Pat. No. 752,261 or in U.S. Pat. Nos. 3,394,164 and 3,644,457; acylated urea group-containing polyisocyanates according to German Pat. No. 1,230,778: biuret group-containing polyisocyanates of the type described, for example, in U.S. Pat. Nos. 3,124,605 and 3,201,372 and in British Pat. No. 889,050; polyisocyanates produced by telomerization reactions of the type described, for example, in U.S. Pat. Nos. 3,654,106; ester group-containing polyisocyanates of the type mentioned, for example, in British Pat. Nos. 965,474 and 1,072,956, in U.S. Pat. No. 3,567,763 and in German Pat. No. 1,231,688: reaction products of the above-mentioned isocyanates with acetals according to German Pat. No. 1,072,385; and polymeric fatty acid ester-containing polyisocyanates (U.S. Pat. No. 3,455,883).

It is also possible to use the isocyanate group-containing distillation residues produced during industrial isocyanate production, optionally dissolved in one or more of the above-mentioned polyisocyanates. It is also possible to use any mixtures of the above-mentioned polyisocyanates.

Polyisocyanates which can easily be obtained industrially are generally preferred. Such readily available polyisocyanates include 2,4- and 2,6-toluylene diisocyanate and any mixtures of these isomers ("TDI"); polyphenyl-polymethylene-polyisocyanates of the type produced by aniline formaldehyde condensation and subsequent phosgenation ("crude MDI"); and carbodiimide group-, urethane group-, allophanate group-, isocyanurate group-, urea group- or biuret group-containing polyisocyanates ("modified polyisocyanates"), in particular those modified polyisocyanates which are derived from 2,4- and/or 2,6-toluylene diisocyanate or from 4,4'- and/or 2,4'-diphenylmethane diisocyanate.

Other compounds which may optionally be used as starting components in the production of the isocyanate addition products of the present invention include compounds containing at least 2 hydrogen atoms which are reactive towards isocyanates and generally have a molecular weight of from 400 to 10,000. These compounds may contain amino groups, thiol groups, carboxyl groups or preferably hydroxyl groups. Preferred isocyanate-reactive compounds contain from 2 to 8 hydroxyl groups and have a molecular weight of from 1000 to 5000 (more preferably from 800 to 3000). Examples of these compounds are polyesters, polyethers, polythioethers, polyacetals, polycarbonates and polyesteramides containing at least 2, generally from 2 to 8, but preferably from 2 to 4 hydroxyl groups. Such compounds are known to those skilled in the art to be useful for the production of homogeneous and cellular polyurethanes.

Suitable hydroxyl group-containing polyesters include, for example, reaction products of polyhydric (preferably dihydric and optionally also trihydric) alcohols with polyvalent (preferably divalent) carboxylic acids. The corresponding polycarboxylic acid anhydrides or corresponding polycarboxylic acid esters of lower alcohols or mixtures thereof can be used instead of the free polycarboxylic acids for the production of the polyesters. The polycarboxylic acids may be aliphatic, cycloaliphatic, aromatic and/or heterocyclic in nature and may optionally be substituted by, for example, halogen atoms and/or unsaturated.

Examples of appropriate carboxylic acids and derivatives thereof include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, glutaric acid anhydride, maleic acid, maleic acid anhydride, fumaric acid, dimerized and trimerized unsaturated fatty acids (optionally mixed with monomeric unsaturated fatty acids such as oleic acid), terephthalic acid dimethyl ester and terephthalic acid-bis-glycol ester.

Suitable polyhydric alcohols include ethylene glycol, (1,2)-propylene glycol and (1,3)-propylene glycol, (1,4)- and (2,3)-butylene glycol, (1,6)-hexane diol, (1,8)-octane diol, neopentyl glycol, 1,4-bis-hydroxymethyl-cyclohexane, 2-methyl-1,3-propane diol, glycerin, trimethylolpropane, (1,2,6)-hexane triol, (1,2,4)-butane triol, trimethylol ethane, pentaerythritol, quinitol, mannitol, sorbitol, formitol, methyl glycoside, diethylene glycol, triethylene glycol, tetraethylene glycol and higher polyethylene glycols, dipropylene glycol and higher polypropylene glycols as well as dibutylene glycol and higher polybutylene glycols.

The polyesters can, in part, contain terminal carboxyl groups. Polyesters of lactones, for example ε-caprolactone, and of hydroxy carboxylic acids, for example ω-hydroxy-caproic acid may also be used.

The polyethers containing at least 2, generally from 2 to 8, preferably from 2 to 3 hydroxyl groups which may be used in the present invention include those produced, for example by polymerization of epoxides (such as ethylene oxide, propylene oxide, butylene oxide, tetrahydrofuran, styrene oxide or epichlorohydrin) with themselves, for example in the presence of Lewis catalysts (such as BF$_3$), or by addition of the epoxides (preferably of ethylene oxide and propylene oxide), optionally in a mixture or in succession, to starting components with reactive hydrogen atoms. Starting components with reactive hydrogen atoms include water; ammonia; alcohols, such as ethylene glycol, (1,3)- or (1,2)-propylene glycol, trimethylol propane, glycerin, sorbitol, and 4,4'-dihydroxy-diphenyl propane; and amines such as aniline, ethanol amine and ethylene diamine. Sucrose polyethers of the type described, for example, in German Auslegeschriften Nos. 1,176,358 and 1,064,938, as well as polyethers started on formitol or formose (German Offenlegungsschriften Nos. 2,639,083 and 2,737,951) may also be used in the present invention. Polyethers containing predominantly (up to 90 wt. %, based on all OH groups present in the polyether) primary OH groups are preferred in many cases. OH group-containing polybutadienes are also suitable.

Suitable polythioethers include, in particular, the condensation products of thiodiglycol with itself and/or with other glycols, dicarboxylic acids, formaldehyde, amino carboxylic acids or amino alcohols. The products of such condensations are, for example, polythio mixed ethers, polythio ether esters or polythio ether ester amides, depending upon the co-component.

Suitable polyacetals which may be used as active-hydrogen containing compounds include the compounds which can be produced from glycols such as diethylene glycol, triethylene glycol, 4,4'-dioxethoxy diphenyl dimethyl methane, hexane diol and formaldehyde. Appropriate polyacetals may also be produced by polymerization of cyclic acetals such as trioxane (German Offenlegungsschrift No. 1,694,128).

Suitable hydroxyl group-containing polycarbonates include those of known type which can be produced, for example, by reaction of glycols (such as (1,3)-propane diol, (1,4)-butane diol and/or (1,6)-hexane diol, diethylene glycol, triethylene glycol, tetraethylene glycol or thiodiglycol) with diaryl carbonates (for example, diphenyl carbonate) or phosgene (German Auslegeschriften Nos. 1,694,080, 1,915,908 and 2,221,751; German Offenlegungsschrift No. 2,605,024).

Appropriate polyester amides and polyamides include the predominantly linear condensates obtained from polyvalent saturated or unsaturated carboxylic acids and the anhydrides thereof and polyhydric saturated or unsaturated amino alcohols, diamines, polyamines and mixtures thereof.

Polyhydroxyl compounds already containing urethane or urea groups as well as optionally modified natural polyols (such as castor oil) or carbohydrates (for example starch) can also be used as optional starting components in the present invention. Addition products of alkylene oxides to phenol formaldehyde resins or also to urea formaldehyde resins may also be used in the present invention.

The above-mentioned polyhydroxyl compounds may be further modified in a variety of ways before being used in the polyisocyanate polyaddition process. According to German Offenlegungsschriften No. 2,210,839 (U.S. Pat. No. 3,849,515) and 2,544,195, a mixture of various polyhydroxyl compounds (for example a polyether and a polyester polyol) may be condensed by etherification in the presence of a strong acid to form a higher molecular weight polyol which is made up of various segments joined via ether bridges. It is also possible according to German Offenlegungsschrift No. 2,559,372, to introduce amide groups into the polyhydroxyl compounds. German Offenlegungsschrift No. 2,620,487 teaches introduction of triazine groups into a polyhydroxyl compound by reaction with polyfunctional cyanic acid esters. Guanidine, phosphonoforamidine or acyl urea group containing polyhydroxyl compounds (German Offenlegungsschriften Nos. 2,714,289, 2,714,292 and 2,714,793) may be obtained by reaction of the polyol with a less than equivalent quantity of a diisocyanato carbodiimide and subsequent reaction of the carbodiimide group with an amine, amide, phosphite or a carboxylic acid. In some cases, it is particularly worthwhile to convert the higher molecular weight polyhydroxyl compounds completely or partially into the corresponding anthranilic acid esters by reaction with isatoic acid anhydride, as described in German Offenlegungsschriften Nos. 2,019,432 and 2,619,840 and in U.S. Pat. Nos. 3,808,250, 3,975,428 and 4,016,143. Higher molecular weight compounds with terminal aromatic amino groups are obtained in this way. Higher molecular weight compounds containing terminal amino groups may also be obtained by reaction of NCO prepolymers with hydroxyl group-containing enamines, aldimines or ketamines and subsequent hydrolysis (German Offenlegungsschrift No. 2,546,536 and U.S. Pat. No. 3,865,791). Other processes for producing higher molecular weight compounds with terminal amino groups or hydrazide groups are described in German Offenlegungsschrift No. 1,694,152 (U.S. Pat. No. 3,625,871).

In accordance with the present invention, it is also possible to use polyhydroxyl compounds containing high molecular weight polyadducts and polycondensates or polymers in finely-dispersed or dissolved form. Such polyhydroxyl compounds may be obtained, for example, by polyaddition reactions (for example reactions between polyisocyanates and amino functional compounds) or polycondensation reactions (for example between formaldehydes and phenols and/or amines) which are carried out in situ in the above-mentioned hydroxyl group-containing compounds. Such polyhydroxyl compounds containing polyadducts and polycondensates are described, for example, in German Auslegeschriften Nos. 1,168,075 and 1,260,142, and in German Offenlegungsschriften Nos. 2,324,134, 2,423,984, 2,512,385, 2,513,815, 2,550,796, 2,550,797, 2,550,833, 2,550,862, 2,633,293 and 2,639,254. It is also possible according to U.S. Pat. No. 3,869,413 and German Offenlegungsschrift No. 2,550,860 to mix a prefabricated aqueous polymer dispersion with a polyhydroxyl compound and then to remove the water from the mixture.

Polyhydroxyl compounds which have been modified by vinyl polymers, of the type obtained, for example, by polymerization of styrene and acrylonitrile in the presence of polyethers (U.S. Pat. Nos. 3,383,341, 3,304,273, 2,523,093, 3,110,695: German Auslegeschrift No. 1,152,536) or polycarbonate polyols (German Pat. No. 1,769,795: U.S. Pat. No. 3,637,909) are also suitable for the present invention. Plastics having particularly high flame-resistance are obtained when polyether polyols modified (according to German Offenlegungsschriften Nos. 2,442,101, 2,644,922 and 2,646,141) by graft polymerization with vinyl phosphonic acid esters and optionally (meth)acrylonitrile, (meth)acrylamide or OH-functional (meth)acrylic acid esters are used. Polyhydroxyl compounds into which carboxyl groups have been introduced by radical graft polymerization using unsaturated carboxylic acids and optionally further olefinically unsaturated monomers (German Offenlegungsschriften Nos. 2,714,291, 2,739,620 and 2,654,746) can be used to particular advantage in combination with mineral fillers.

When using modified polyhydroxyl compounds of the above-mentioned type as starting components in the polyisocyanate polyaddition process, polyurethane plastics having substantially improved mechanical properties are obtained in many cases.

Examples of the above-mentioned compounds which may be used in the present invention are described, for example, in High Polymers, Volume XVI, "Polyurethanes, Chemistry and Technology", edited by Saunders-Frisch, Interscience Publishers, New York, London, Edition I, 1962, pages 32 to 42 and pages 44 to 54 and Edition II, 1964, pages 5 to 6 and 198 to 199, and in Kunststoff-Handbuch, Vol. VII, Vieweg-Hochtlen, Carl-Hanser-Verlag, Munich, 1966, for example on pages 45–71. Mixtures of the above-mentioned compounds with at least 2 hydrogen atoms which are capable of reacting with isocyanates and have a molecular weight of from 400 to 10,000 (for example, mixtures of polyethers and polyesters) can also be used in the practice of the present invention. It is particularly advantageous in some cases to combine low-melting and high-melting polyhydroxyl compounds with each other (German Offenlegungsschrift No. 2,706,297).

Other optional components which may be used in the present invention include compounds containing at least 2 hydrogen atoms which react with isocyanates and have a molecular weight of from 32 to 400. These include compounds containing hydroxyl groups and/or amino groups and/or thiol groups and/or carboxyl groups, preferably compounds containing hydroxyl groups and/or amino groups which act as chain extenders or cross-linking agents. These compounds generally contain from 2 to 8, preferably from 2 to 4 hydrogen atoms which are reactive towards isocyanates. It is also possible to use mixtures of various compounds containing at least 2 hydrogen atoms which are reactive towards isocyanates and have a molecular weight of from 2 to 400.

Examples of these compounds include: ethylene glycol, (1,2)- and (1,3)-propylene glycol, (1,4)- and (2,3)-butylene glycol, (1,5)-pentane diol, (1,6)-hexane diol, (1,8)-octane diol, neopentyl glycol, 1,4-bis-hydroxy methyl-cyclohexane, 2-methyl-1,3-propane diol, dibromobutene diol (U.S. Pat. No. 3,723,392), glycerin, trimethylol propane, (1,2,6)-hexane triol, trimethylolethane, pentaerythritol, quinitol, mannitol, sorbitol, castor oil, diethylene glycol, triethylene glycol, tetraethylene glycol, higher polyethylene glycols having a molecular weight of up to 400, dipropylene glycol, higher polypropylene glycols having a molecular weight of up to 400, dibutylene glycol, higher butylene glycols having a molecular weight of up to 400, 4,4'-dihydroxy-diphenylpropane-dihydroxymethyl-hydroquinone, ethanol amine, diethanol amine, N-methyldiethanol amine, triethanol amine and 3-aminopropanol.

Suitable lower molecular weight polyols useful in the present invention also include mixtures of hydroxyaldehydes and hydroxyketones ("formose") and the polyhydric alcohols obtained from them by reduction ("formitol"). Such mixtures may be obtained by selfcondensation of formaldehyde hydrate in the presence of metal compound catalysts and of compounds capable of forming enediol cocatalysts (German Offenlegungsschriften Nos. 2,639,084, 2,714,084, 2,714,104, 2,721,186, 2,738,154 and 2,738,512). In order to obtain plastics with improved flame-resistance, such formoses are advantageously combined with amino plastic-forming agents and/or phosphites (German Offenlegungsschriften Nos. 2,738,513 and 2,738,532). Solutions of polyisocyanate polyaddition products, in particular of ionic group-containing polyurethane ureas and/or of polyhydrazodicarbonamides in lower molecular polyhydric alcohols can also be used in the present invention as an optional polyol component (German Offenlegungsschrift No. 2,638,759).

Aliphatic diamines which are suitable for use in the present invention include ethylene diamine, 1,4-tetramethylene diamine, 1,11-undecamethylene diamine, 1,12-dodecamethylene diamine and mixtures thereof; 1-amino-3,3,5-trimethyl-5-aminomethyl cyclohexane ("isophorone diamine"): 2,4- and 2,6-hexahydrotoluylene diamine and mixtures thereof; perhydro-2,4'- and 4,4'-diaminodiphenyl methane: p-xylylene diamine: bis-(3-aminopropyl)-methylamine, diaminoperhydroanthracenes (German Offenlegungsschrift No. 2,638,731); and cycloaliphatic triamines (German Offenlegungsschrift No. 2,614,244). Hydrazine and substituted hydrazines (for example methyl hydrazine, N,N'-dimethyl hydrazine and homologs thereof) as well as acid dihydrazides such as carbodihydrazide, oxalic acid dihydrazide, the dihydrazides of malonic acid, succinic acid, glutaric acid, adipic acid, β-methyl adipic acid, sebacic acid, hydracrylic acid and terephthalic acid; semicarbazido alkylene hydrazides such as β-semicarbazido propionic acid hydrazide (German Offenlegungsschrift No. 1,770,591): semicarbazido alkylene carbazine esters such as 2-semicarbazido ethyl carbazine ester (German Offenlegungsschrift No. 1,918,504); and amino semicarbazide compounds such as β-aminoethyl semicarbazido carbonate (German Offenlegungsschrift No. 1,902,931) can also be used in the practice of the present invention. The amino groups can be completely or partially blocked by aldimine or ketimine groups to control their reactivity (U.S. Pat. No. 3,734,894; German Offenlegungsschrift No. 2,637,115).

Examples of appropriate aromatic diamines include bis-anthranilic acid esters (German Offenlegungsschriften Nos. 2,040,644 and 2,160,590); 3,5- and 2,4-diamino benzoic acid esters (German Offenlegungsschrift No. 2,025,900): ester group-containing diamines (described in German Offenlegungsschriften No. 1,803,635 (U.S. Pat. Nos. 3,681,290 and 3,736,350), 2,040,650 and 2,160,589); ether group-containing diamines (German Offenlegungsschriften Nos. 1,770,525 and 1,809,172 (U.S. Pat. Nos. 3,654,364 and 3,736,295); 2-halogen-1,3-phenylene diamines optionally substituted at the 5-position (German Offenlegungsschriften Nos. 2,001,772, 2,025,896 and 2,065,869): 3,3'-dichloro-4,4'-diamino diphenyl methane; toluylene diamine; 4,4'-diamino diphenyl methane; 4,4'-diamino diphenyl disulfides (German Offenlegungsschrift No. 2,404,976); diamino diphenyl dithioethers (German Offenlegungsschrift No. 2,509,404); aromatic diamines substituted by alkyl thio groups (German Offenlegungsschrift No. 2,638,760); diamino benzene phosphonic acid esters (German Offenlegungsschrift No. 2,459,491); sulfonate or carboxylate group-containing aromatic diamines (German Offenlegungsschrift No. 2,720,166); and high melting diamines (German Offenlegungsschrift No. 2,635,400). The amino alkyl thio anilines disclosed in German Offenlegungsschrift No. 2,734,574 are examples of aliphatic aromatic diamines.

Compounds such as 1-mercapto-3-amino propane; optionally substituted amino acids, such as glycine, alanine, valine, serine and lysine; and optionally substituted dicarboxylic acids such as succinic acid, adipic acid, phthalic acid, 4-hydroxy phthalic acid and 4-amino phthalic acid may also be used in the present invention as chain extenders. Compounds which are monofunctional towards isocyanates can also be used in proportions of from 0.01 to 10 wt. % (based on polyisocyanate) as so-called chain breakers. Monofunctional compounds of this type include monoamines such as butyl and dibutyl amine, octyl amine, stearyl amine, N-methyl stearyl amine, pyrrolidine, piperidine and cyclohexyl amine and monoalcohols such as butanol, 2-ethyl hexanol, octanol, dodecanol, various amyl alcohols, cyclohexanol and ethylene glycol monoethyl ether.

Optional auxiliary agents and additives useful in the present invention include water and/or readily volatile inorganic or organic substances which act as blowing agents. Suitable organic blowing agents include acetone; ethyl acetate; halogen-substituted alkanes such as methylene chloride, chloroform, ethylidene chloride, vinylidene chloride, monofluorotrichloro methane, chlorodifluoro methane, dichlorodifluoro methane: and butane, hexane, heptane or diethyl ether.

Inorganic blowing agents include for example, air, $CO_2$ and $N_2O$. A blowing effect can also be achieved by addition of compounds which decompose at temperatures above room temperature with release of gases. For example, nitrogen is released by azo compounds such as azodicarbonamide or azoisobutyric acid nitrile. Further examples of blowing agents and details about the use of blowing agents are given in Kunststoff-Handbuch, Volume VII edited by Vieweg and Hochtlen, Carl-Hanser-Verlag, Munich, 1966, for example on pages 108 and 109, 453 to 455 and 507 to 510.

Catalysts of known type may be used in the process of the present invention, for example, tertiary amines such as triethyl amine, tributyl amine, N-methyl morpholine, N-ethyl morpholine, N,N,N',N'-tetramethyl ethylene diamine, pentamethyl diethylene triamine and higher homologs (German Offenlegungsschriften Nos. 2,624,527 and 2,624,528), 1,4-diazabicyclo (2,2,2)-octane, N-methyl-N'-dimethyl amino ethyl piperazine, bis-(dimethyl amino alkyl)-piperizine (German Offenlegungsschrift No. 2,636,787), N,N-dimethyl benzyl amine, N,N-dimethyl cyclohexyl amine, N,N-diethyl benzyl amine, bis-(N,N-diethyl amino-ethyl)-adipate, N,N,N',N'-tetramethyl-1,3-butane diamine, N,N-dimethyl-$\beta$-phenyl ethyl amine, 1,2-dimethylimidazole, 2-methylimidazole, monocyclic and bicyclic amidines (German Offenlegungsschrift No. 1,720,633), bis-(dialkyl amino) alkyl ethers (U.S. Pat. No. 3,330,782, German Auslegeschrift No. 1,030,558, German Offenlegungsschriften Nos. 1,804,361 and 2,618,280) as well as amide group (preferably formamide group)-containing tertiary amines (German Offenlegungsschriften Nos. 2,523,633 and 2,732,292) may be used as catalysts. Suitable catalysts also include known Mannich bases from secondary amines (such as dimethyl amine) and aldehydes (preferably formaldehyde), ketones (such as acetone, methylethyl ketone or cyclohexanone) and phenols (such as phenol, nonylphenol and bisphenol).

Triethanol amine, triisopropanol amine, N-methyl-diethanol amine, N-ethyl-diethanol amine, N,N-dimethyl-ethanol amine, the reaction products thereof with alkylene oxides (such as propylene oxide and/or ethylene oxide) as well as secondary tertiary amines (German Offenlegungsschrift No. 2,732,292) are tertiary amines containing hydrogen atoms which are active towards isocyanate groups as catalysts. Other suitable catalysts include silaamines with carbon silicon bonds of the type described in German Pat. No. 1,229,290 (corresponding to U.S. Pat. No. 3,620,984) such as 2.2,4-trimethyl-2-silamorpholine and 1,3-diethyl amino methyl tetramethyl disiloxane. The appropriate catalysts also include nitrogen-containing bases such as tetraalkyl ammonium hydroxides; alkali hydroxides such as sodium hydroxide: alkali phenolates such as sodium phenolate; and alkali alcoholates such as sodium methylate. Hexahydrotriazines may also be used as catalysts (German Offenlegungsschrift No. 1,769,043).

The reaction between NCO-groups and Zerewitinoff-active hydrogen atoms is also greatly accelerated by lactams and azalactams. An associated substance between the lactam and the compound with reactive hydrogen initially forms. Associated substances of this type and the catalytic effect thereof are described in German Offenlegungsschriften Nos. 2,062,288, 2,062,289, 2,117,576 (U.S. Pat. Nos. 3,758,444) 2,129,198, 2,330,175 and 2,330,211.

It is also possible to use organic metal compounds, in particular organic tin compounds as catalysts. In addition to sulfur-containing compounds (such as di-n-octyl tin mercaptide (German Auslegeschrift No. 1,769,367: U.S. Pat. No. 3,645,927), tin (II)-salts of carboxylic acids (such as tin (II)-acetate, tin (II)-octoate, tin (II)-ethyl hexoate and tin (II)-laurate) and tin (IV)-compounds (for example dibutyl tin oxide, dibutyl tin dichloride, dibutyl tin diacetate, dibutyl tin dilaurate, dibutyl tin maleate or dioctyl tin diacetate) can be used as organic metal catalysts.

All of the above-mentioned catalysts may of course be used as mixtures. Combinations of organic metal compounds and amidines, amino pyridines or hydrazino pyridines (German Offenlegungsschriften Nos. 2,434,185, 2,601,082 and 2,603,834) are of particular interest.

Further examples of catalysts useful in the present invention as well as details about the mode of operation of such catalysts are given in Kunststoff-Handbuch, Volume VII edited by Vieweg and Hochtlen, Carl-Hanser-Verlag, Munich 1966 on pages 96–102.

If used the catalysts are generally used in a quantity of between about 0.001 and 10 wt. %, based on the quantity of polyisocyanate.

Surface-active additives such as emulsifiers and foam stabilizers may also optionally be used in the practice of the present invention. Suitable emulsifiers include the sodium salts of castor oil sulfonates or salts of fatty acid with amines such as oleic acid diethyl amine or stearic acid diethanol amine. Alkali or ammonium salts of sulfonic acids (such as dodecyl benzene sulfonic acid or dinaphthy methane sulfonic acid) or of fatty acids (such as ricinoleic acid) or of polymeric fatty acids may also be used as surface-active additives.

Polyether siloxanes, especially those which are water-soluble, are particularly suitable as foam stabilizers. These compounds are generally a copolymer of ethylene oxide and propylene oxide bound with a polydimethyl siloxane.radical. Foam stabilizers of this type are described, for example, in U.S. Pat. Nos. 2,834,748, 2,917,480 and 3,629,308. Polysiloxane polyoxyalkylene copolymers (German Offenlegungsschrift No. 2,558,523) which are branched via allophanate groups are of particular interest in many cases.

Reaction retarders, for example, acid reacting substances such as hydrochloric acid or organic acid halides; cell regulators of known type such as paraffins, fatty alcohols or dimethyl polysiloxanes; pigments or dyes; flame-proofing agents of known type, such as tris-chloroethyl phosphate, tricresyl phosphate, ammonium phosphate and polyphosphate; stabilizers against the effects of aging and weathering: plasticizers: fungistatically and bacteriostatically acting substances; and fillers such as barium sulphate, diatomaceous earth, carbon black or prepared chalk may also be used in the practice of the present invention.

Additional examples of surface-active additives and foam stabilizers as well as cell regulators, reaction retarders, stabilizers, flame-retarding substances, plasticizers, dyes and fillers and fungistatically and bacteriostatically acting substances as well as details about the use and mode of operation of these additives are given in Kunststoff-Handbuch, Volume VII, edited by Vieweg and Hochtlen, Carl-Hanser-Verlag, Munich, 1966, for example on pages 103–113.

In the process of the present invention, the reaction components may be reacted, for example, by the known single-stage process, the prepolymer process or the semi-prepolymer process. Generally the characteristic numbers range from 50 to 300, preferably from 95 to 250, that means that 50 to 300, preferably 95 to 250 equivalents NCO are used per 100 equivalents OH. Mechanical devices which may be used include those described in U.S. Pat. No. 2,764,565. Details about other processing devices which can also be used in the practice of the present invention are given in Kunststoff Handbuch, Volume VII, edited by Vieweg and Hochtlen, Carl-Hanser-Verlag, Munich 1966, on pages 121–205.

If the product of the present invention is to be in the form of a foam, foaming may be carried out in closed molds. The reaction mixture is introduced into a mold. Metal (for example aluminum) or plastic (for example epoxide resin) can be used as the mold material. The foamable reaction mixture foams in the mold and forms the molded article. Mold foaming can be carried out in such a way that the molding has a cellular structure on its surface or it can be carried out in such a way that the molding has a dense skin and a cellular core. It is also possible to introduce sufficient foamable reaction mixture into the mold for the foam formed to just fill the mold. However, it is also possible to introduce more foamable reaction mixture into the mold than necessary for filling the mold cavity with foam (i.e. by "overcharging"). Such molding techniques are described in U.S. Pat. Nos. 3,178,490 and 3,182,104.

During mold foaming, known "external release agents" such as silicone oils are used in many cases. However, it is also possible to use so-called "internal release agents", optionally mixed with external release agents, of the type disclosed, for example, in German Offenlegungsschriften No. 2,121,670 and 2,307,589.

It is also possible to produce foams by block foaming or by the known laminator process.

The products of the present invention are useful as insulation panels for roof insulation.

The invention is further illustrated but is not intended to be limited by the following examples in which all parts and percentages are by weight unless otherwise specified.

EXAMPLES

EXAMPLE 1

Polyol mixtures were made from the materials indicated in Table 1 and the solubility thereof for trichlorofluoromethane was examined.

Polyisocyanurate foams were produced from these polyol mixtures and the burning behavior was examined in a small burner test. It was found that even though each of the foams exhibited identical burning behavior, much better R11 (trichlorofluoro methane) solubility was obtained with the foams of the present invention. This difference in R11 solubility is significant in cases where two component machines are employed.

TABLE 1

|  | 1a | 1b (Comparison example) | 1c (Comparison example) |
|---|---|---|---|
| dimethyl-cyclohexylamine (g) | 1 | 1 | 1 |
| Solution of 8% sodium acetate and 15 g potassium acetate in a glycol mixture (g) | 5.3 | 5.3 | 5.3 |
| trichloroethylphosphate (g) | — | 8.3 | — |

TABLE 1-continued

|  | 1a | 1b (Comparison example) | 1c (Comparison example) |
|---|---|---|---|
| 1-phosphonoethane-2-carboxylic acid trimethylester (g) | 8.3 | — | — |
| silicone stabilizer L 5420 (sold by UCC) (g) | 3 | 3 | 3 |
| sugar-propyleneoxide-polyether OH-number 380 (g) | 50 | 50 | 50 |
| phthalic acid-diethylene glycol ester, OH-number 200 (g) | 50 | 50 | 50 |
| trichlorofluoro methane (R11) (g) | 47 | 47 | 47 |
| crude 4,4'-diphenyl methane diisocyanate NCO-content 31% by weight (g) | 173 | 173 | 173 |
| characteristic number | 190 | 190 | 190 |
| solubility g R11 in g quantity of given mixture | 53 | 40 | 39 |
| flame height in mm in B2 test according to DIN 4102 | 150 | 150 | 165 |

EXAMPLE 2

Flame-resistant polyurethane foams were produced by mixing the materials indicated in Table 2.

TABLE 2

|  | a | b (Comparison) |
|---|---|---|
| dimethylcyclohexylamine (g) | 1.5 | 1.5 |
| silicone stabilizer L 5420 sold by UCC (g) | 1 | 1 |
| sugar propylene oxide-polyether, OH-number 470 (g) | 30 | 30 |
| dibromo butene diol polyether (IXOL B 251, Solvay), OH-number 335 (g) | 28 | 28 |
| glycerin (g) | 9 | 9 |
| trichloroethyl phosphate (g) | — | — |
| 1-phosphonoethane-2-carboxylic acid trimethyl ester (g) | 17 | — |
| ethylene diamine-propylene oxide polyether, OH-number 630 (g) | 14.4 | 14.4 |
| water (g) | 0.6 | 0.6 |
| crude 4,4'-diphenyl-methane diisocyanate, NCO content: 31% by weight (g) | 145 | 145 |
| solubility of trichloro fluoromethane in 100 g polyol mixture | 32 | 24 |
| flame height in mm in small burner test according to DIN 4102 | 140 | 140 |

In the examples, all the starting materials—except the polyisocyanate—were premixed and kept at 23° C. This mixture ("polyol mixture") was then mixed with the polyisocyanate for 10 seconds by aid of a stirrer having a rotation speed of 4000/minute. The mixture obtained was poured into a paper mold wherein the foam was formed.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a polyisocyanate addition product in which a polyisocyanate (a) is reacted with a compound (b) selected from the group consisting of 1-phosphonoethane-2-carboxylic acid-tri-$C_1$–$C_4$-alkyl esters, 1-phosphonopropane-2-carboxylic acid-tri-$C_1$–$C_4$-alkyl esters and mixtures thereof.

2. The process of claim 1 in which compound (b) is used in a quantity of from 1 to 20 wt. %, based on polyisocyanate addition product.

3. The process of claim 1 in which compound (b) is used in a quantity of from 2 to 10 wt. %, based on polyisocyanate addition product.

4. The process of claim 1 in which compound (b) is selected from the group consisting of 1-phosphonoethane-2-carboxylic acid-trimethyl ester, 1-phosphonopropane-2-carboxylic acid-trimethyl ester and mixtures thereof.

5. The process of claim 1 in which an additional compound (c) containing at least two hydrogen atoms which are reactive with isocyanate groups and has a molecular weight of from 400 to 10,000 is reacted with polyisocyanate (a) and compound (b).

6. The process of claim 5 in which compound (c) contains hydroxyl groups.

7. The process of claim 6 in which a blowing agent (d) is included in the reaction mixture.

8. The process of claim 7 in which compound (b) is used in a quantity of from 1 to 20 wt. %, based on polyisocyanate addition product.

9. The process of claim 6 in which compound (b) is used in a quantity of from 1 to 20 wt. %, based on polyisocyanate addition product.

10. The process of claim 1 in which the polyisocyanate addition product is a polyurethane plastic.

11. The process of claim 1 in which the polyisocyanate addition product is a polyurethane foam.

12. The process of claim 1 in which the polyisocyanate addition product is a polyisocyanate plastic.

13. The process of claim 1 in which the polyisocyanate addition product is a polyisocyanate foam.

14. A polyisocyanate addition product which is the reaction product of a polyisocyanate (a) and a compound (b) selected from the group consisting of 1-phosphonoethane-2-carboxylic acid-tri-$C_1$–$C_4$-alkyl esters, 1-phosphonopropane-2-carboxylic acid-tri-$C_1$–$C_4$-alkyl esters and mixtures thereof.

15. The polyisocyanate addition product of claim 14 in which (c) a compound containing at least two hydrogen atoms which are reactive with isocyanate groups and having a molecular weight of from 400 to 10,000 was included in the reaction mixture.

16. The polyisocyanate addition product of claim 14 which is a polyurethane.

17. The polyisocyanate addition product of claim 14 which is in the form of a polyurethane foam.

18. The polyisocyanate addition product of claim 14 which is a polyisocyanurate.

19. The polyisocyanate addition product of claim 14 which is in the form of a polyisocyanurate foam.

* * * * *